United States Patent [19]
Hailston

[11] Patent Number: 5,913,527
[45] Date of Patent: Jun. 22, 1999

[54] HAND TRUCKS HAVING MULTIPLE, FOLDABLE BOTTLE-CARRYING TRAYS AND METHODS OF CONSTRUCTING THE HAND TRUCKS

[75] Inventor: Bruce L. Hailston, Midland, Mich.

[73] Assignee: Magline, Inc., Pinconning, Mich.

[21] Appl. No.: 08/812,935

[22] Filed: Mar. 4, 1997

Related U.S. Application Data

[60] Provisional application No. 60/013,033, Mar. 8, 1996.

[51] Int. Cl.[6] .......................................... B62B 1/02
[52] U.S. Cl. ...................................... 280/47.28; 280/47.24
[58] Field of Search ............................. 280/47.27, 47.28, 280/47.29, 47.35, 79.5, 47.19, 47.2, 47.24

[56] References Cited

U.S. PATENT DOCUMENTS

| | | |
|---|---|---|
| D. 270,136 | 8/1983 | Cox . |
| 1,099,584 | 6/1914 | Wedge ................................. 280/47.28 |
| 1,155,336 | 10/1915 | Buckwalter ......................... 280/47.28 |
| 2,453,246 | 11/1948 | Moksnes . |
| 2,522,894 | 9/1950 | Putman . |
| 2,723,863 | 11/1955 | Mattio . |
| 3,079,168 | 2/1963 | Monroe et al. . |
| 4,205,937 | 6/1980 | Fawley . |
| 4,235,449 | 11/1980 | Tarran ................................. 280/47.28 |
| 4,418,969 | 12/1983 | Hettman . |
| 4,753,445 | 6/1988 | Ferrare . |
| 5,104,135 | 4/1992 | Sheets . |
| 5,393,081 | 2/1995 | Mortenson . |

FOREIGN PATENT DOCUMENTS

| | | |
|---|---|---|
| 227962 | 2/1959 | Australia . |
| 280834 | 7/1988 | European Pat. Off. . |
| 1194258 | 11/1959 | France . |
| 1531622 | 7/1966 | France . |
| 2491852 | 10/1980 | France . |
| 1577963 | 7/1989 | France . |
| 513762 | 2/1955 | Italy . |
| 206873 | 8/1939 | Switzerland . |
| 345248 | 9/1959 | Switzerland . |
| 1245486 | 7/1985 | U.S.S.R. . |
| 2047526 | 12/1980 | United Kingdom . |

*Primary Examiner*—Richard M. Camby
*Attorney, Agent, or Firm*—Reising, Ethington, Learman & McCulloch, PLLC

[57] ABSTRACT

An improved hand truck has a pair of laterally spaced side rails, connected by crosswise braces laterally to form a hand truck frame. Axle supporting front to rear extending brackets are fixed to the lower ends of the side rails and mount axle and wheel mechanism. A forwardly projecting nose piece is fixed to the lower end of the frame. A plurality of trays having product stabilizing crosswise wall abutments of a crosswise length less than the spacing between the side rails have rearwardly extending tray brackets hingedly supported by the frame side rails for movement from a substantially horizontal load supporting operative position above the nose piece to a vertically disposed inoperative stowed position in substantial parallelism with the side rails in which the tray abutments extend between the side rails.

16 Claims, 11 Drawing Sheets

HAND TRUCKS HAVING MULTIPLE, FOLDABLE BOTTLE-CARRYING TRAYS AND METHODS OF CONSTRUCTING THE HAND TRUCKS

This application claims the benefit of U.S. Provisional Application No. 06/013,033 Mar. 8, 1996.

This invention relates to hand trucks and more particularly to those adapted for transporting large 5-gallon bottles of drinking water. The disclosure incorporates the hand trucks and methods disclosed in provisional patent application 60/013,033, filed Mar. 8, 1996, whose priority is claimed for this application.

BACKGROUND OF THE INVENTION

Drinking water is commonly packaged and sold in large glass or plastic bottles having volume capacities of about 5 gallons. The containers are very bulky and heavy, weighing about 50 pounds each.

Drinking water is also sold commercially in smaller-sized bottles (e.g., ½ and 1 liter bottles) which are packaged in multiple units in a cardboard box or carton for delivery to a retailer, or to the consumer at the home or office. Such cartons also are bulky and heavy and it is not unusual for a retailer or business to purchase drinking water in both the large 5 gallon containers for general consumption and in the smaller containers for individual consumption.

Because of their bulky size and weight, personnel who deliver these products find it convenient to use a hand truck when transporting these products from the delivery truck to the consumer's home or place of business. To be efficient, it is desirable to transport as many bottles or cartons of bottles in each trip from the truck to the home or business as can safely be managed. With a conventional two-wheeled hand truck of the type having a single load-supporting nose piece projecting forwardly from the bottom of the frame, only one 5-gallon sized bottle should be handled at a time and loaded in an upright, stable position on the nosepiece of the truck. One or more cartons of the smaller-sized bottled water products may be transported by the truck if the cartons are stacked upon one another.

An existing prior art U.S. patent discloses a hand truck adapted exclusively for use in handling one or more of the large 5-gallon type bottled water containers. Fixed support appendages project forwardly from the side rails of the truck in spaced apart relation for engaging and supporting the water bottles between them on their sides in fore to aft lengthwise orientation with respect to the truck. Recognizing that such a load is inherently unstable by placing too much of the weight forwardly of the wheels, the patent discloses rearwardly curving side rails to shift the upper bottles rearwardly and thereby distribute the load more evenly over the wheels. The fixed nature of the support arms and rearward curvature of the side rails is objectionable in the present inventor's view because it increases the overall front-to-back dimension of the hand truck making it bulkier and more difficult to store than a conventional straight-railed hand truck. Furthermore, the prior art hand truck is dedicated exclusively to the handling of 5-gallon bottled water containers and is not designed to handle other products as well, such as cartons of the smaller-size bottled water products.

A hand truck constructed in accordance with the present invention overcomes the foregoing objections.

SUMMARY OF THE INVENTION

A two-wheeled hand truck constructed in accordance with the present invention includes a frame having a pair of horizontally spaced, vertically extending side rails connected laterally to form a hand truck frame and having a handle incorporated with an upper portion thereof which can be grasped by the operator of the hand truck. A pair of laterally spaced wheels are carried on an axle mounted rearwardly of the frame by a pair of brackets. A load-supporting nose piece is secured at the lower end of the frame and extends forwardly therefrom to provide a load support platform. Supported at spaced intervals along the length of the linear side rails of the frame are withdrawable load support platforms or trays for supporting one or more of the large, 5-gallon type bottled water containers on its side or sides in a cross-wise orientation to the truck so as to provide a very stable, balanced load during transport.

According to a preferred embodiment of the invention, the trays have an open-ended trough-like configuration which cradles the bottles to stabilize them fore and aft during transport. The trays are hinged to the frame and configured for movement between an operative use position in which the racks project transversely forwardly of the side rails for supporting the water bottle containers in cross-wise relation to the frame, and a stowed vertical position flatwise to the rails in which the trays are folded preferably upwardly from their use positions so as to extend generally parallel to the side rails when not in use. This latter position provides generally unobstructed access to the area above the nose plate permitting, if desired, the nose plate to be used in a conventional manner to lift and support a stack of containers or the like. The bottle trays are movable independently of one another between the stowed and use positions. This has the advantage of enabling the operator to swing one or more of the lower bottle trays to their stowed position so as to permit the loading of one or more cartons of the individual bottled water product on the nose plate, while at the same time permitting one or more of the upper bottle trays to remain in the use position to accommodate, simultaneously, the loading of one or more of the large 5-gallon type containers of bottled water. Thus, the individually foldable trays provide versatility enabling the hand truck to be used to support several of the large 5-gallon type bottled water containers, several cartons of the smaller-sized bottled water containers, or combinations of both.

According to another preferred feature of the invention, the hinged bottle trays have abutment surfaces which confront the front face of the side rails when extended to the use position to support the racks and their loads. This provides a simple and reliable means of supporting the bottle trays without significant modification of the otherwise standard side rails.

Another advantage of the individually foldable bottle trays is that the upper trays can be folded upwardly to provide free accessibility from above to the lower trays during loading, thus simplifying the bottle loading procedure.

These and other objects and advantages of the invention will become more readily apparent to those skilled in the art when considered in connection with the ensuing detailed description and accompanying drawings.

THE DRAWINGS

A presently preferred embodiment of the invention is disclosed in the following description and in the accompanying drawings, wherein.

DETAILED DESCRIPTION

Referring now more particularly to the accompanying drawings, it is to be understood that the hand truck of the present invention is typically of the general character disclosed in U.S. Pat. No. 3,997,182 and U.S. Pat. No. 5,393,081, which are commonly owned by the assignee of the present invention and whose disclosures are incorporated herein by reference. The hand truck 10 of the present invention, like that of the '182 and '081 patents, includes a pair of laterally spaced wheels 12 mounted on opposite ends of an axle 14 which in turn is secured to the lower end of a generally rectangular, load-carrying, primary or main frame 16 by a pair of mounting brackets 18, in known manner as disclosed, for example, in the aforementioned '182 patent.

Figures 6, 7:
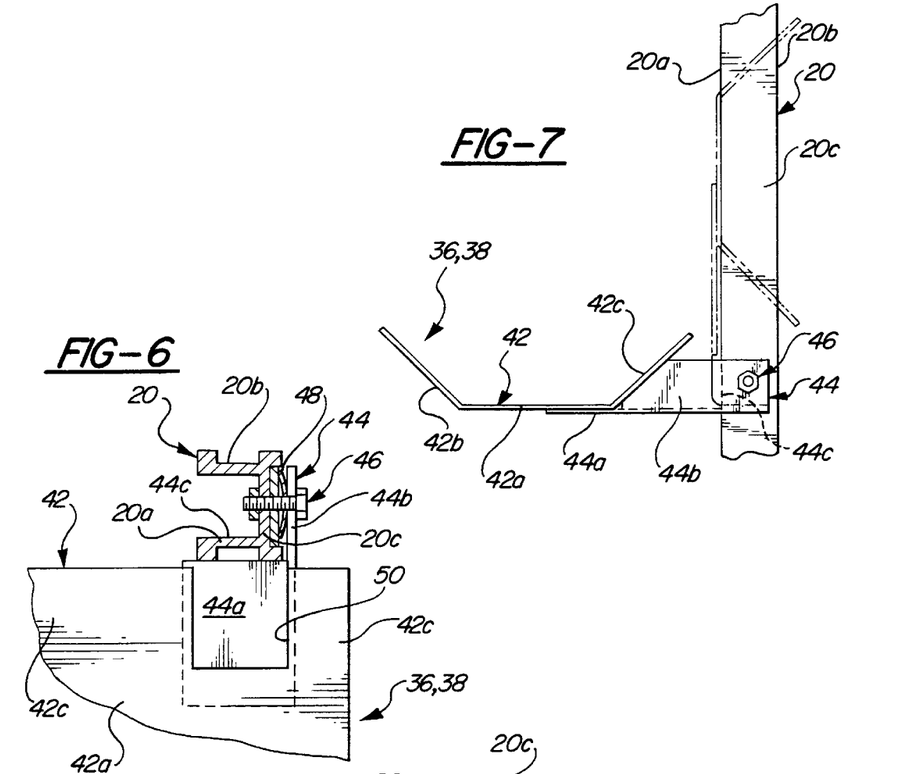
FIG. 6 is a schematic enlarged fragmentary cross-sectional view showing the hinged connections between the upper bottle trays and the side rails.
FIG. 7 is an enlarged fragmentary side-elevational view showing one of the upper bottle trays in the use and stowed positions.

The frame 16 is preferably of the type having a pair of parallel vertical side rails 20, which are preferably channel-shaped extrusions which open laterally inwardly of the frame and have spaced apart front and back walls 20a, 20b, connected by a web 20c, as illustrated in FIG. 6. The configuration of rails 20 may be considered to be that disclosed in the aforementioned '182 patent. The side rails 20 at their upper ends receive the legs 22 of a bale-shaped handle member generally designated 24 which may be secured in position by suitable bolt and nut assemblies 26, according to conventional practice. A plurality of vertically spaced cross braces 28 extend between the side rails 20 and are similarly bolted in position by nut and bolt assemblies 30, according to conventional practice. The various parts of the hand truck are preferably formed of aluminum and may comprise extrusions, fabricated parts, castings or die castings.

Projecting forwardly from the primary frame 16 is an angle-shaped nose piece, generally designated 32, having a forwardly extending fixed load platform 32a with an upper load-supporting surface 32b upon which a load to be transported may be supported in the usual manner. The nose piece 32 includes rear facial portions 32c which abut the front surface 20a of the side rails 20. Angularly extending side portions 32d of the nose piece abut the laterally inner sides of the rails 20 and may be secured to the rails 20 by the same nut and bolt assemblies 34 which are used to secure the brackets 18 to the laterally outer sides 20c of the rails 20, as in the aforementioned '182 patent.

The modifications to the otherwise conventional hand truck made according to one embodiment of the invention will now be described. At least one, and preferably a plurality of bottle support trays, 36, 38 and 40, are mounted on the frame 16 and include vertically spaced platforms 42 which, when in use, project forwardly of the rails 20 to support a corresponding plurality of the large 5-gallon type bottles of drinking water, designated generally B, arranged one above the other crosswisely to the frame 16, as shown in the drawings. The platforms 42 are preferably trough-shaped and include generally rectangular bottom wall portions 42a that lie generally perpendicular to the rails 20 when supporting the bottles B, and forward and rearward product stabilizing wall portions or abutments 42b, 42c, respectively, that project upwardly and outwardly fore and aft of the bottom wall 42a at an acute angle with respect to the plane of the bottom wall portion 42a. The side wall portions 42b, 42c are of a restricted length so as to fit between the side rails 20 when the trays 36, 38, and 40 are swung to the inoperative stored position shown in chain lines in FIGS. 7 and 8. This preferred arrangement cradles the bottles B supported on the platforms 42 to provide support surface under most of the length of the bottles and prevent them from shifting, particularly forwardly, on the platforms. Of course, other platform configurations that support the bottles B crosswisely and cradle them in such manner to prevent them from shifting fore and aft are contemplated. The essentially flat bottomed platform construction disclosed importantly can be folded flush with the rails of the frame when it is not in use, as will be described in greater detail.

Figure 1:
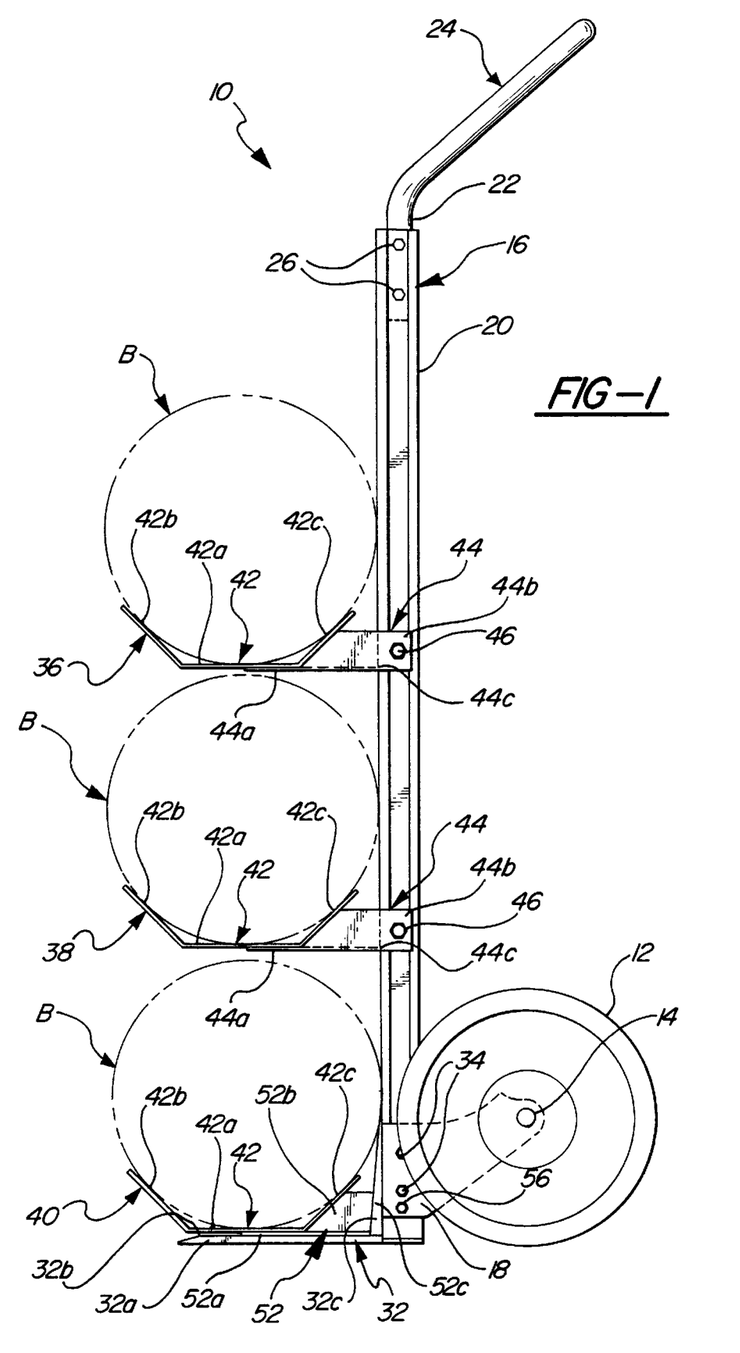
FIG. 1 is a side elevational view of a hand truck, constructed in accordance with a presently preferred embodiment of the invention, shown supporting three 5-gallon sized bottled water containers.
Figure 2:
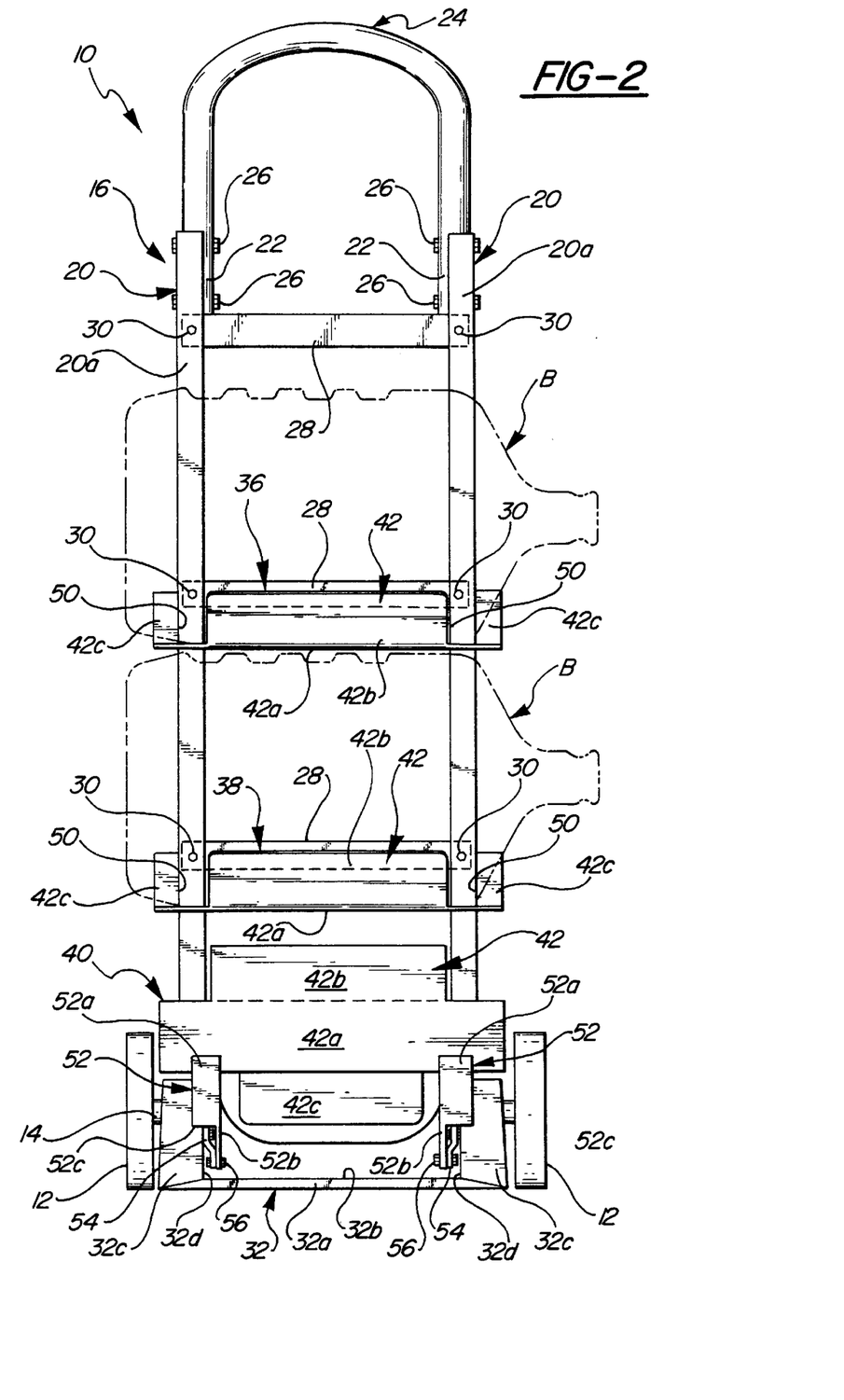
FIG. 2 is a front elevational view of the hand truck of FIG. 1, but with the lower bottle tray moved to the stowed position.
Figures 3, 4, 5:
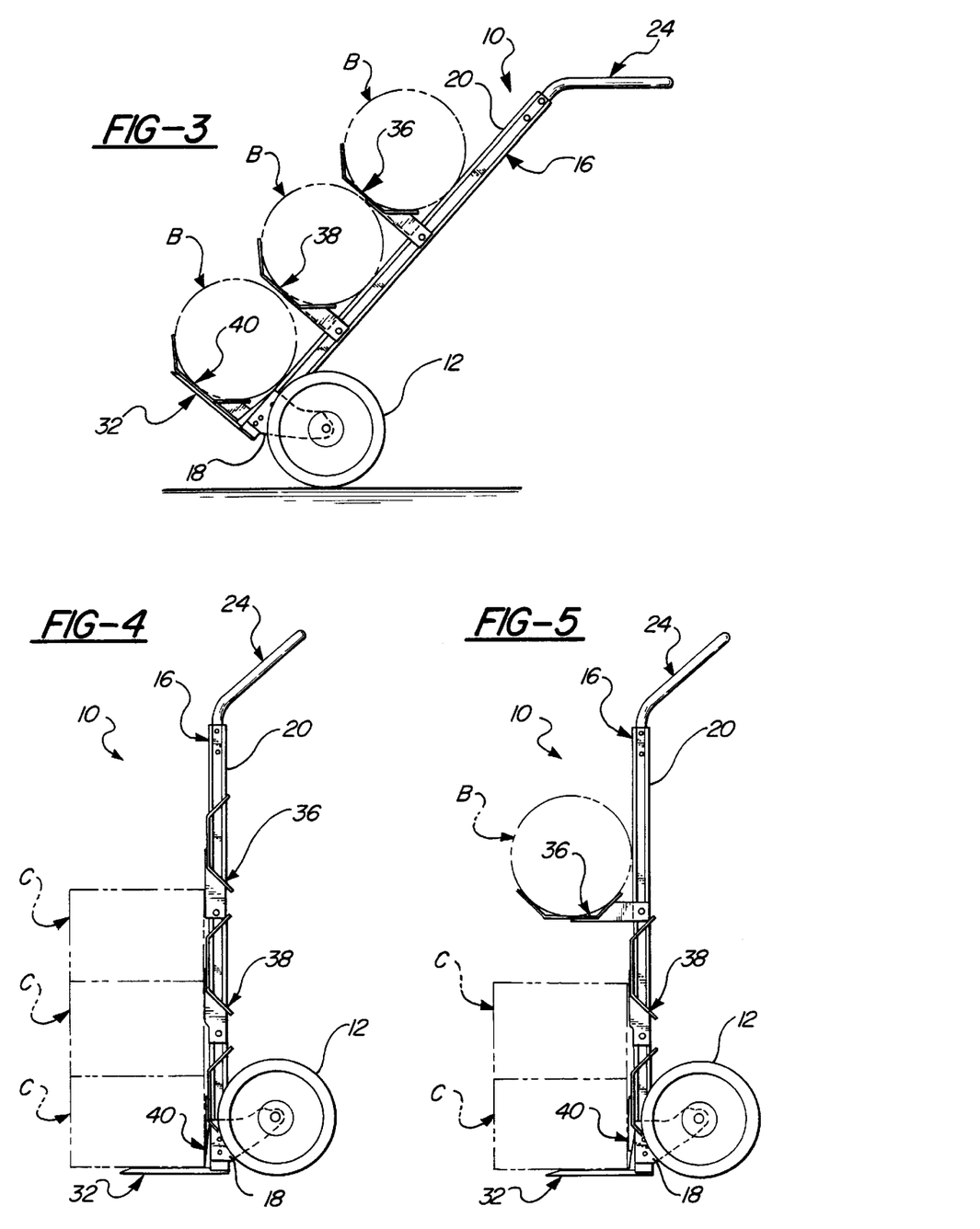
FIG. 3 is a view like FIG. 1 but showing the hand truck inclined rearwardly as during transport of the load.
FIG. 4 is a side elevational view like FIG. 1 but showing the bottle trays moved to their stowed positions and a stack of bottled water cartons shown supported on the nose plate of the truck.
FIG. 5 is a schematic side elevational view of the hand truck showing the lower bottle trays moved to the stowed position to accommodate a stack of bottled water cartons on the nose plate and with the upper tray in the use position to simultaneously support a 5-gallon water bottle container.

It is preferred that the trays be supported on the frame 16 such that the platforms 42 are able to be folded from their operative forwardly extended positions, illustrated in FIG. 1, to a non-obstructing stowed position illustrated in FIG. 4, wherein the platforms extend lengthwisely of the rails 20 and the bottom wall portions 42 of the platforms are substantially flush with the front faces 20a of the rails 20 to enable a load, such as cartons C of the smaller size variety of bottled water containers (e.g., ½ liter, 1 liter, ½ gallon and 1 gallon jugs packaged in quantity in a cardboard box carton or crate as illustrated in FIG. 4) to be supported on the platform 32a of the nose piece 32 in the conventional manner. Although it is contemplated that there are a number of ways of mounting the trays to be movable between the operative and stowed positions, a preferred support system is illustrated in the drawing, with particular attention being drawn to FIGS. 1 and 2 and 6–8.

The top and middle bottle racks 36, 38 are identically constructed and hence the description for one is understood to be equally applicable to the other. Tray mounting brackets 44 are provided adjacent the opposite ends of each of the platforms 42 and are of L-shaped angle configuration, each with a flat base wall 44a and an upstanding laterally outboard vertically disposed sidewall 44b. The base walls 44a are welded or otherwise secured to the undersides of the bottom wall portions 42a of the platforms and extend rearwardly therefrom to free abutment edges 44c which extend across the front faces 20a of the side rails 20. The side walls 44b of the mounting brackets are also joined, such as by welding, to the rearward stabilizing wall portion 42c of the platforms 42. As indicated in FIG. 6 particularly, side walls 44b extend rearwardly therefrom to a position alongside the webs 20c of the side rails 20. Hinge supports, such as the nut and bolt assembly 46, extend through aligned openings in the webs 20c and mount bracket side walls 44b to mount the trays 36, 38 for pivotal movement about the axes of the bolts 46 between the use and stowed positions. A Belleville washer 48, or another functionally equivalent friction device may be interposed between the bracket mounting walls 44 and the rails 20, or between the walls 44 and bolt heads, to provide sufficient resistance to retain the racks 36, 38 in the stowed position until the frictional resistance to movement is overcome by applying sufficient bodily force to move the racks to their use positions.

It will be seen in FIGS. 1, 6 and 7 that when the trays 36, 38 are hinged downwardly, the abutment edge surfaces 44c of the mounting brackets 44 confront the front faces 20a of the side rails 20 to support and fix the trays in their use position. It will also be seen in FIGS. 2 and 6 that the rearward stabilizing wall portions 42c of the platforms 42 are notched or recessed at 50 in front to rear alignment with the side rails 20 in order to pass by the rails 20 when the platforms 42 are folded to their stowed positions. In stowed position only the flat bottom wall portions 42a of the platforms 42 confront the front faces 20a of the side rails, thereby minimizing obstruction of the space over the platform, and permitting the hand truck to be used in a conventional manner to support stacked cartons C and the like on the nose piece 32. sufficiently narrow to pass through the open spaces between the side rails 20 laterally and the braces 28 vertically when the trays are moved to the stowed position.

Figure 8:
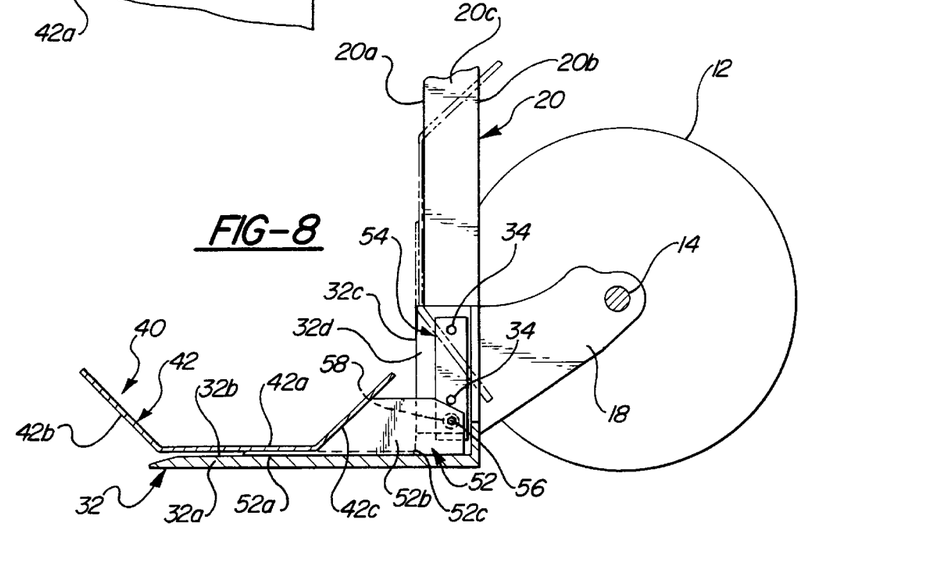
FIG. 8 is an enlarged fragmentary transverse sectional view showing the lower bottle tray in the use and stowed positions.

The support for the lower bottle rack 40 is similarly hinged in nature but modified to accommodate the mounting of the bottom tray 40. The platform 42 of the lower bottle tray 40 similarly is fixed to a pair of mounting brackets 52, each having (FIG. 8) flat base walls 52a and vertically disposed side walls 52b, rearward abutment edge surfaces 52c being provided on base walls 52a. In this case, the side walls 52b are disposed on the laterally inboard side of the rails 20 and extend along and engage the inboard side portions 32d of the nose piece 32, as illustrated in FIG. 8. The edge abutment surfaces 52c confront the front facial portions 32c of the nose piece 32 rather than the front faces of the rails 20. A pair of mount bars 54 are secured to the side portions 32d of the nose piece by the nut and bolt assemblies 34 that hold the wheel brackets 18 to the frame, and include inwardly stepped portions 54a (FIG. 2) at their free ends. Pivot elements, such as the nut and bolt assemblies 56, and Belleville friction washers 58 like those used to mount the top and middle trays 36, 38, which maybe aptly termed friction creating cross pin devices in both instances couple the lower tray hingedly to the stepped portions of the bars 54 to accommodate pivotal movement of the lower tray 40 between the use and stowed positions.

FIGS. 1–5 well illustrate the versatility of the hand truck 10. In FIG. 1, the trays 36, 38, 40 are extended to their operative positions and support three of the large 5-gallon size containers of bottled water B. FIG. 3 illustrates how the load of FIG. 1, when the truck is tilted rearwardly at about a 45° angle during transport, is distributed generally evenly fore and aft of the wheels 12. FIG. 4 illustrates an arrangement wherein all of the racks have been folded to their stowed positions in which they are friction-held in position, enabling a stack of the cartons C to be loaded, in conventional manner, on the platform 32a of the nose piece 32. FIG. 5 illustrates an arrangement wherein both cartons C and the large bottled water containers B are able to be transported simultaneously on the hand truck 10. In this case, the two lowermost racks 38, 40 are folded to the stowed position to accommodate a stack of cartons C on the nose piece platform 32a, and the upper rack 36 is extended to its operative position, spaced above the cartons C, to support a bottled water container B.

THE MODIFIED EMBODIMENT

In FIGS. 9–19, I have disclosed a slightly modified embodiment in which four trays are utilized rather than three. Since many of the components have been earlier described, I have used the same numerals to identify them and applied different numerals only when they are required for identifying differences in the respective constructions. For example, the previous tray structures have been generally identified by the numerals 36, 38, and 40 which are used once again, and the added uppermost tray structure is generally designated 60.

Figure 12:
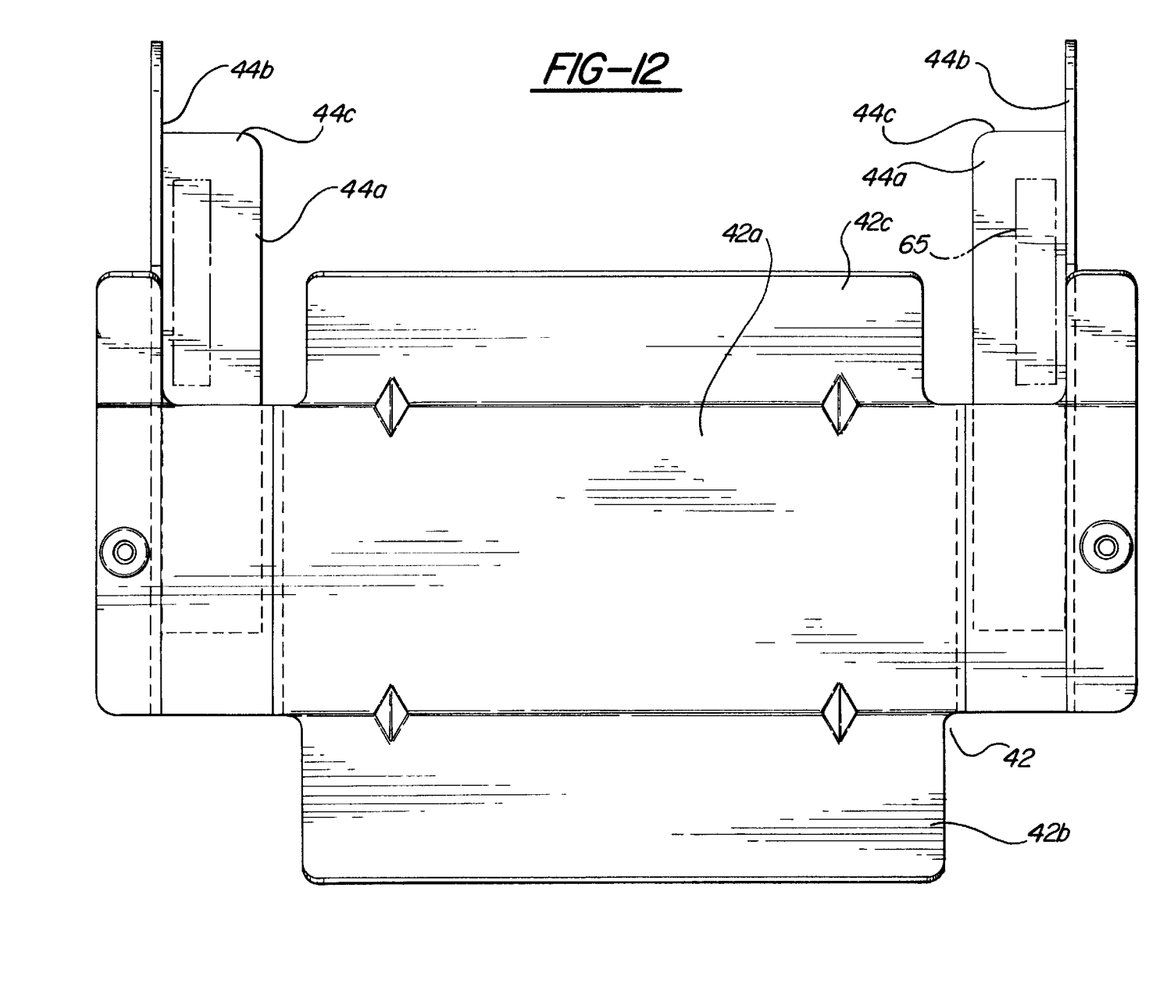
FIG. 12 is a enlarged top plan view of one of the upper trays with the tray brackets illustrated in a position for hingedly attaching the tray to the exterior faces of the hand truck side rails.
Figure 13:
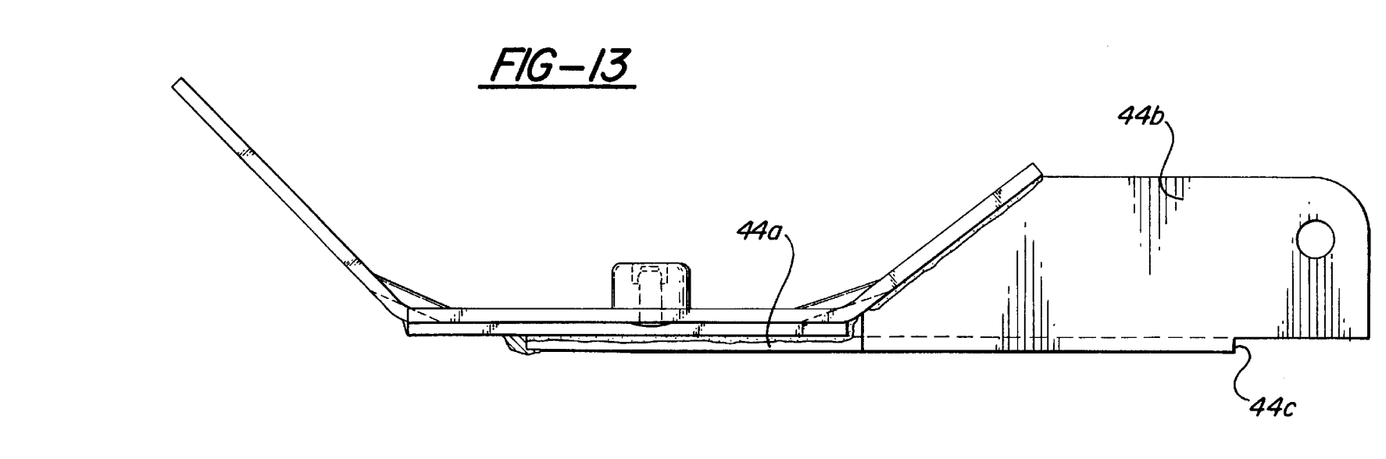
FIG. 13 is an end elevational view thereof.
Figure 14:
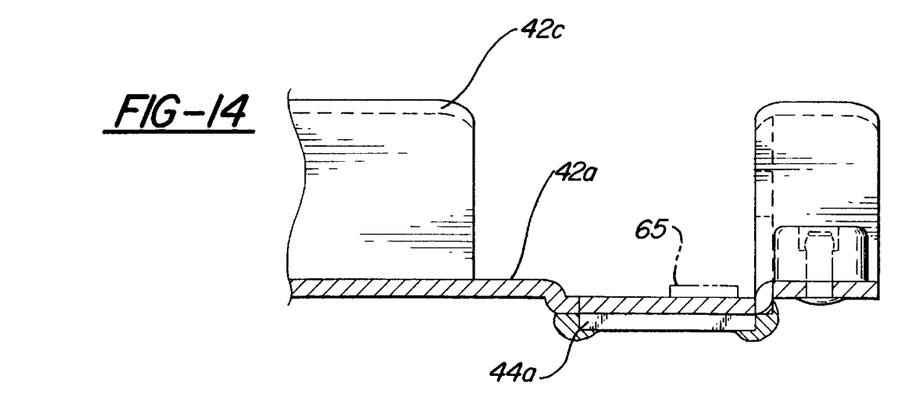
FIG. 14 is an enlarged fragmentary, sectional elevational view taken transversely through the tray.
Figure 15:
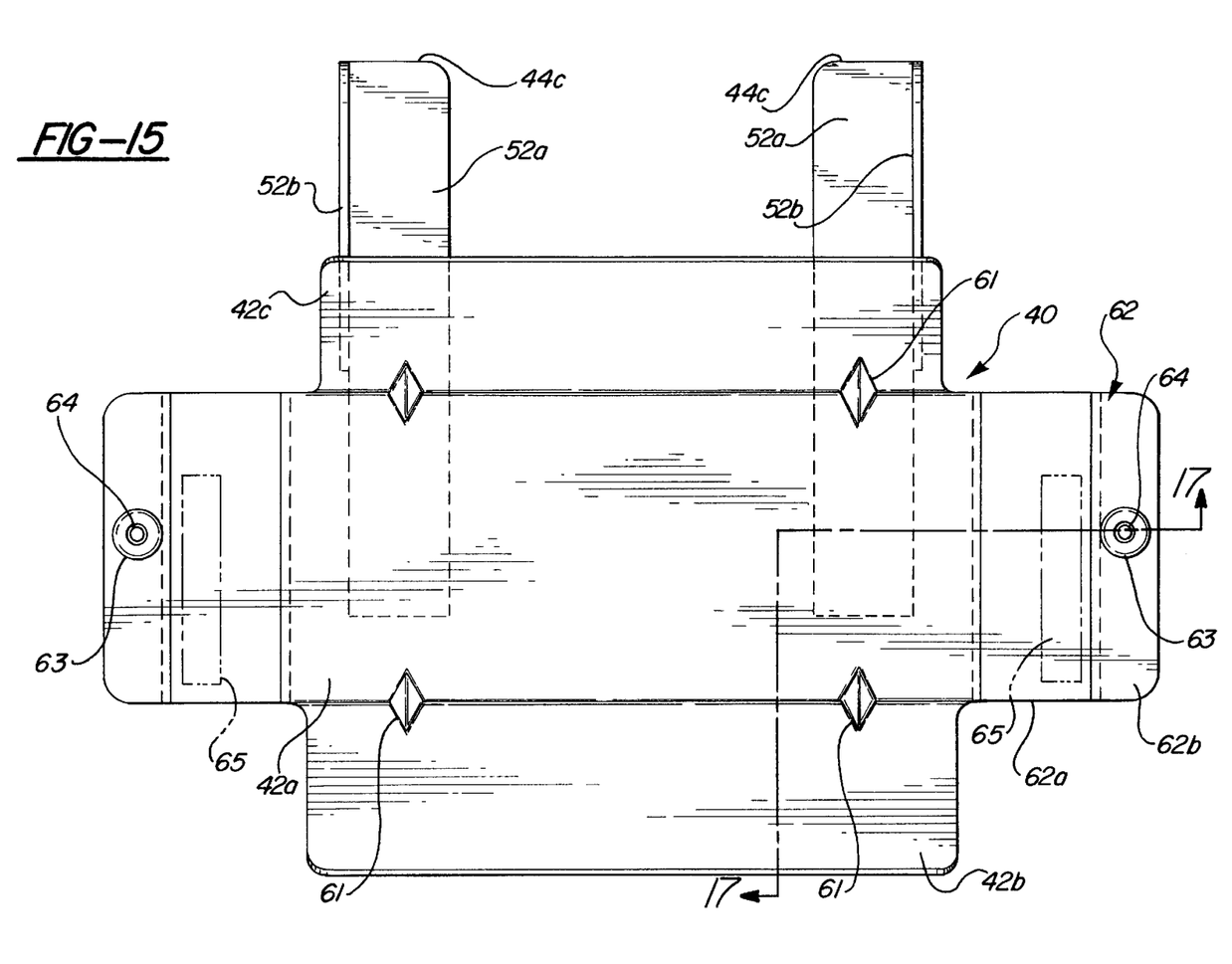
FIG. 15 is an enlarged top plan view similar to FIG. 12, but illustrating the lower most tray which is attached interiorly with respect to the side rail frames.
Figure 16:
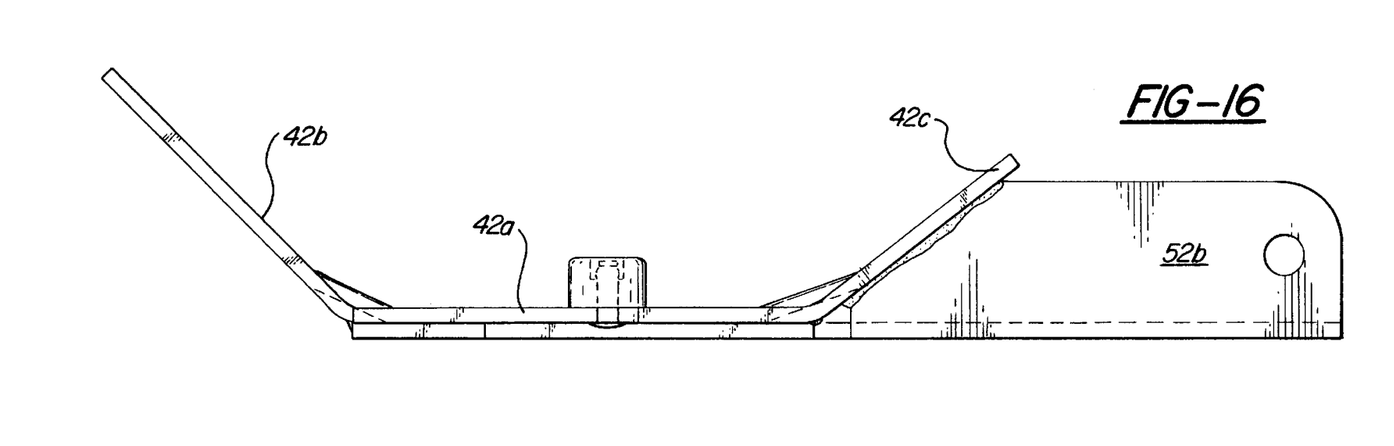
FIG. 16 is an end elevational view thereof.
Figure 17:
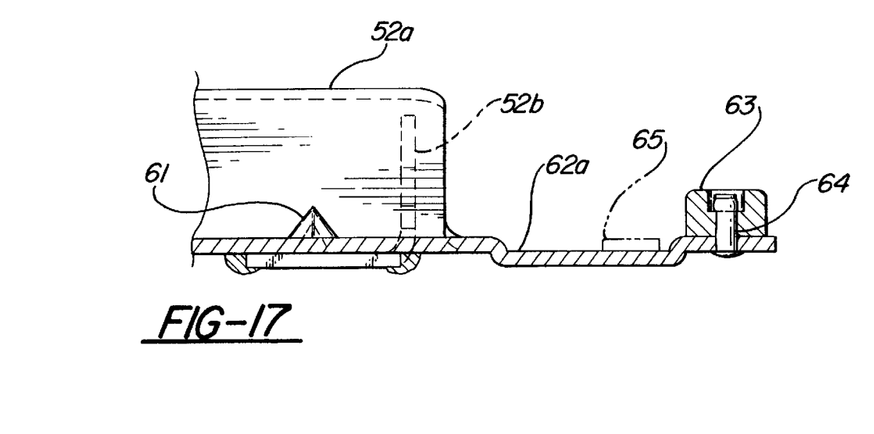
FIG. 17 is a sectional elevational view taken on the line 17—17 of FIG. 16.
Figure 18:
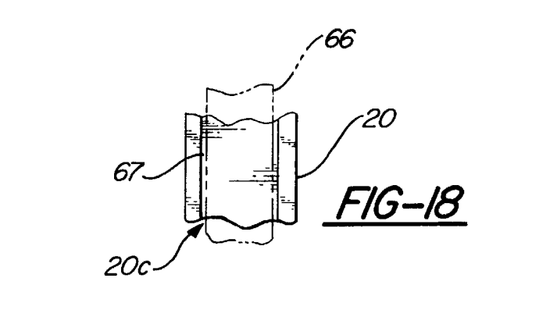
FIG. 18 is an enlarged fragmentary, face elevational view of a portion of one of the side frames illustrating the location of a tray gripping part thereon.
Figure 19:
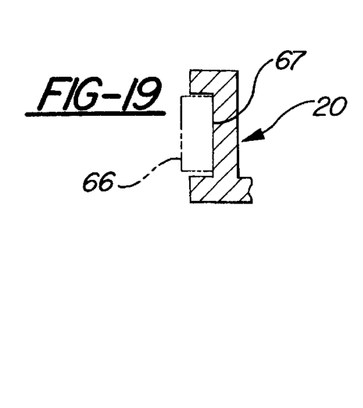
FIG. 19 is a fragmentary edge elevational view thereof.

In the present embodiment, the trays, generally designated 42, and disclosed in FIGS. 12 and 15, have been modified in a manner which now will be disclosed. Both the lowermost tray 40 and the uppermost trays 38, 36, and 60 are disclosed in these figures as one piece trays and, with attached brackets, for strengthening or stiffening purposes, along the fold lines between plates or wings 42b and 42c, and the mid portions 42a, diamond shaped projections 61 are formed in the trays (see FIG. 17 particularly) wherein the metal is pushed upwardly to stiffen the tray expanse.

In addition, end extensions 62 are formed on the trays which have recessed portions 62a and endmost portions 62b. Mounted on the endmost portions 62b are cylindrical rubber bumpers 63, secured by fasteners 64. These bumpers 63 prevent endwise shifting movement of the relatively heavy bottles B. The portions 62a are in transverse alignment with side rails 20 when the trays are swung up to stored position.

While the pivots 46 and 56 provide frictional resistance to pivoting for the purpose of discouraging downward pivoting of the trays from stored position, secondary gripping members are arranged within the recessed portions 62a of the tray in the form of substantially rigid plastic velcro-like strips 65 which may, for example, be adhesively maintained in position. The mating strips 66 of the same structure are provided in exact alignment with the strips 65 on the recessed mid-portions 67 of the front faces of the side rails 20. When the trays are swung up to stored position, the respective strips 65 and 66 interlock and it requires some force to break them away from the side rails 20. The gripping strips 65 and 66 have been shown only diametrically in the drawings inasmuch as they are commercially available strips known as dual lock™ reclosable fasteners which are available from 3M Industrial Specialties Division of the 3M Company in St. Paul, Minn. The model designation of these polymeric, relatively rigid strips is SJ-3560.

It is well known that the strips 65–66 comprise mushroom shaped stems protruding from a plastic backing and when the two mating pieces are pressed together, the mushroom heads interlock, providing fast secure reclosable fastening. The plastic strips are stated to be polyolefin strips, with acrylic adhesive backing utilized to secure them in position.

In applicant's construction, the strips 65, 66, which have 250 mushroom stems per square inch, are hidden in protected position within the recessed portions 62a of the trays and the recessed portions of the front faces of side rails 20. They are, thus, in protected position when the trays are swung open also. In addition to housing the strips 65, the portions 62a of the trays also increase the strength of the tray extensions 62 and provide additional stiffness.

Figure 9:
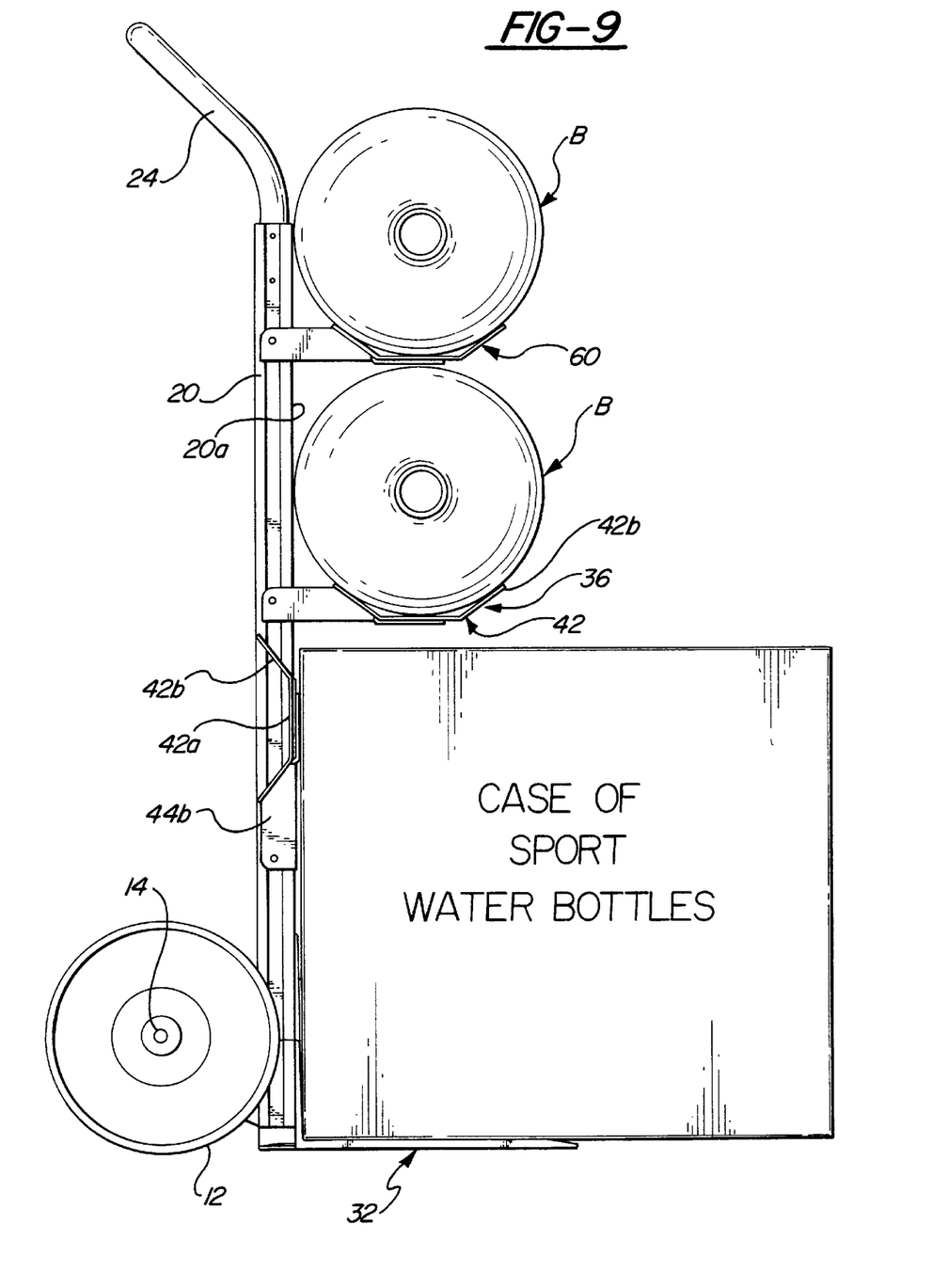
FIG. 9 is a side elevational view of a slightly modified form of the bottle carrying hand truck with two upper trays carrying bottles and two lower trays folded to a stored position flush with the front faces of the side rails of the hand truck.
Figure 10:
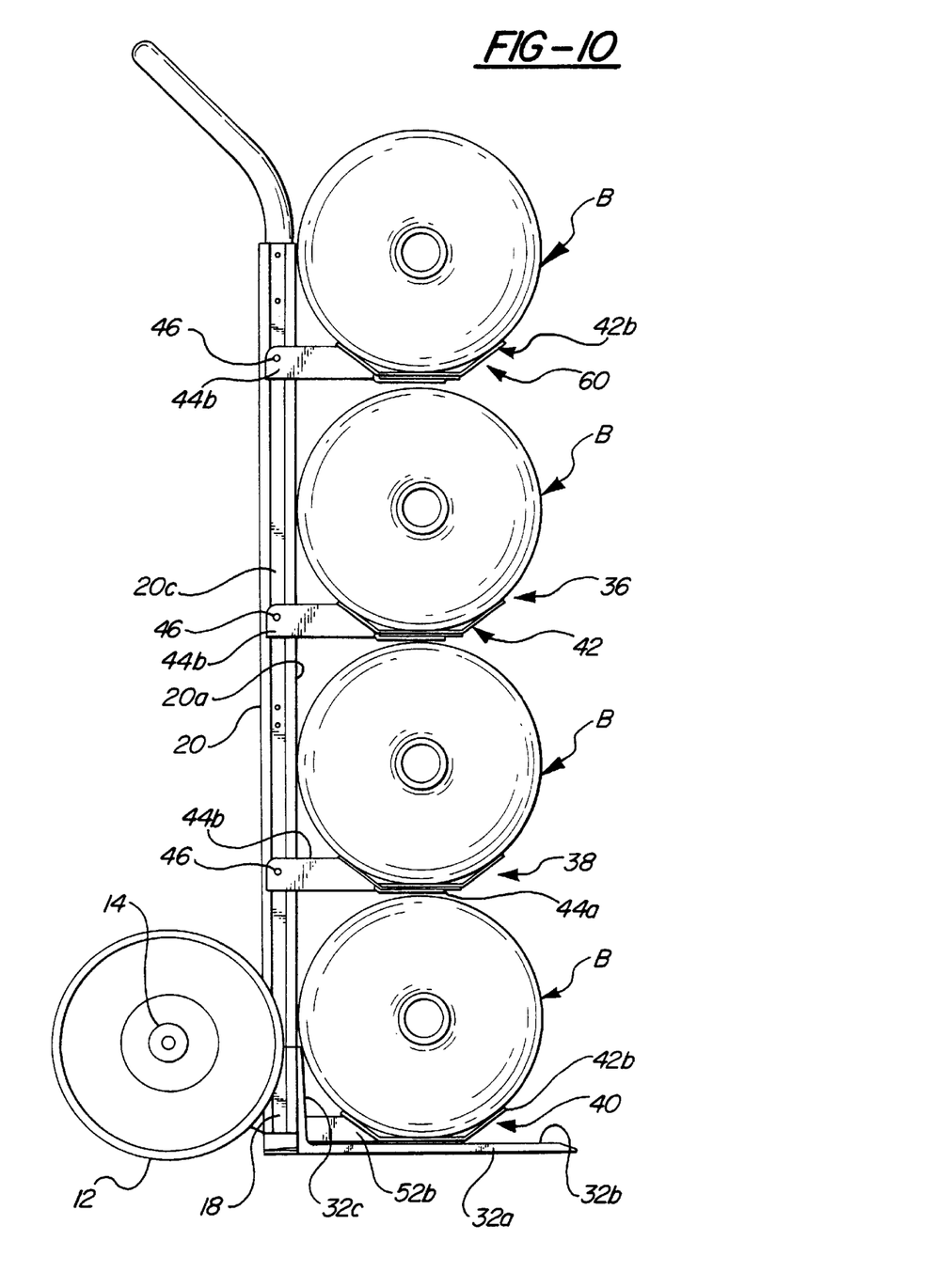
FIG. 10 is a similar side elevational view in which, however, the two lower trays are folded down so that large size bottles can be carried.
Figure 11:
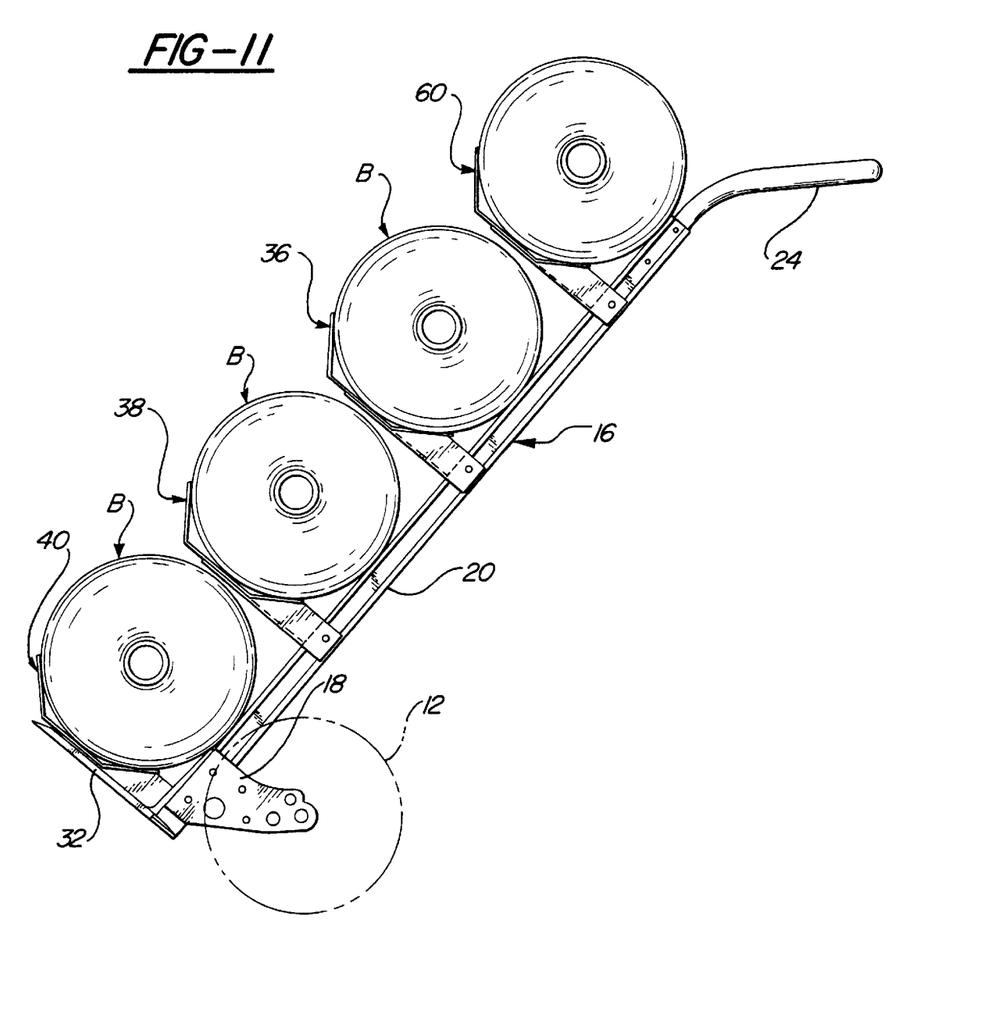
FIG. 11 is a similar side elevational view showing the modified hand truck in a transport position in which the bottles are shown as braced between the bottles trays and the front faces of the side rails.

As shown in FIG. 9, when in stored position, the tray sides 42b and 42c are within the profile or envelope of the hand truck frame as measured by the front to rear extension of side rails 20. Thus wings or abutment walls 42c, for example, do not protrude rearwardly of the side rails 20. Sometimes for large size bottles, it is desirable for the front wings or abutment walls 42b be longer. In order to keep the tray sides or abutment walls within the profile or envelope, they are inclined at a 37°0 angle with respect to the plane of the mid-portion or platform portion 42a of the trays.

It is to be understood that other embodiments of the invention which accomplish the same function are incorporated herein within the scope of any ultimately allowed patent claims.

I claim:

1. In an improved hand truck construction
   a. pair of laterally spaced, vertically extending side rails, connected by crosswise braces laterally to form a hand truck frame, said frame having a handle surface associated with the upper end thereof;
   b. said frame having axle supporting front to rear extending brackets fixed to the lower ends of the side rails and extending rearwardly thereof;
   c. said frame further incorporating an axle and wheel mechanism secured to the rear ends of said brackets;
   d. a nose piece fixed to the lower end of said frame and having a forwardly extending load support platform; and
   e. a plurality of vertically spaced discrete trays having spaced apart product stabilizing crosswise wall abutment parts of a crosswise length less than the spacing between said side rails to be receivable therebetween, said trays having forwardly extending tray brackets hingedly supported by said frame side rails for movement from a substantially horizontal load supporting operative position to a vertically disposed inoperative stowed position in substantial parallelism with said side rails in which said wall abutment parts extend between said side rails inboard thereof and do not obstruct nose piece load carrying capacity.

2. The hand truck of claim 1 wherein said wall abutment parts, when said trays are in operative position, include a rearwardly and upwardly angled rear wall section braced by said tray brackets.

3. The hand truck of claim 1 wherein said plurality of trays includes a lowermost tray in which said wall abutment parts are constituted as a central portion of a crosswise abutment wall section formed by notching the abutment wall section so that the said central portion passes between the side rails when the said lowermost tray is moved to the inoperative stowed position.

4. The hand truck of claim 3 wherein said tray brackets on said lowermost tray include laterally extending plate portions engaging said nose piece to brace the load carried by said lowermost tray on the nosepiece when said tray is in operative position.

5. The hand truck of claim 4 wherein said plate portions extend substantially vertically parallel to said side rails in stowed position.

6. The hand truck of claim 1 wherein said brackets have laterally extending plate sections, generally parallel with said trays, with rear edges which engage said frontal faces of the side rails to brace the trays when the trays are moved to operative position.

7. The hand truck of claim 6 wherein said tray brackets, except for said lowermost tray, have rearwardly extending bars hingedly connected by friction creating cross pin devices to the outboard sides of said side rails, and said lowermost tray brackets have rearwardly extending bars hingedly connected by friction creating cross pin devices to the inboard sides of said side rails.

8. The hand truck of claim 1 wherein said trays have front to rear extending recessed portions laterally outboard of said abutment wall parts, generally rigid plastic velcro-like strips are fixed therein in protected position, and mating generally rigid plastic velcro-like strips are fixed on said side rail front faces such as to be engaged by said strips on the trays when the trays are swung to stored position substantially in vertical alignment with the front faces of the side rails.

9. The hand truck of claim 8 wherein said front faces of the side rails have recessed portions and said mating generally rigid velcro-like strips are mounted therein.

10. A method of making an improved hand truck construction comprising the steps of:
   a. connecting a pair of laterally spaced, vertically extending side rails with crosswise braces laterally to form a hand truck frame and provide a handle surface which can be grasped, associated with the upper end thereof;
   b. fixing axle supporting front to rear extending brackets to the lower ends of the side rails to extend rearwardly thereof;
   c. securing an axle and wheel mechanism to the rear ends of said brackets;
   d. connecting a nose piece having a forwardly extending load support platform to the lower end of said frame; and
   e. connecting a plurality of trays having product stabilizing wall abutments of a crosswise length less than the spacing between said side rails by connecting forwardly extending tray brackets hingedly to said frame side rails for movement from a substantially horizontal load support operative position to a vertically disposed inoperative stowed position in substantial parallelism with said side rails in which said tray abutments extend between said side rails.

11. The method of claim 10 including affixing a lowermost tray in which one of said abutments is constituted as a crosswise abutment wall section formed by notching the wall abutment so that the said abutment wall section passes between the side rails when the said lowermost tray is moved to the inoperative stowed position.

12. The method of claim 10 wherein said brackets have laterally extending plate sections, generally parallel with said trays, with rear edges which engage said frontal faces of the side rails to brace the trays when the trays are moved to operative position.

13. The method of claim 12 wherein said tray brackets, except for said lowermost tray, have rearwardly extending bars, and the method includes hingedly connecting the bars to the side rails with friction creating cross pin devices.

14. The method of claim 10 comprising providing said trays with fore to aft extending recesses, mounting generally rigid plastic velcro-like strips there in protected position and mounting mating generally rigid plastic velcro-like strips on the front faces of said side rails in a position to mate with the tray mounted strips when the trays are swung to a stored position substantially flush with said side rail front faces.

15. A method of using an improved hand truck construction having a pair of laterally spaced, vertically extending side rails, connected by crosswise braces laterally to form a hand truck frame, said frame having a handle surface associated with the upper end thereof and axle supporting front to rear extending brackets fixed to the lower ends of the side rails and extending rearwardly thereof; said frame further incorporating an axle and wheel mechanism secured to the rear ends of said brackets; the frame further having a nose piece fixed to the lower end of said frame providing a forwardly extending load support platform, and also having a plurality of trays with product restraining abutments and forwardly extending tray brackets hingedly supported by said frame side rails for moving said trays from a substantially horizontal load supporting operative position to a vertically disposed inoperative stowed position in substantial parallelism with said side rails in which said tray abutments extend between said side rails inboard thereof and do not obstruct nose piece load carrying capacity; the steps of:

a. moving said trays to operative position and loading a liquid containing bottle to each of said trays in a crosswisely disposed orientation such as to be restrained by said abutments;

b. tilting said frame and transporting said bottles to the location desired;

c. removing said bottles individually;

d. folding said trays upwardly to stowed position;

e. with said trays folded upwardly, loading a stack of products to be carried on said nose piece;

f. tilting said frame and transporting said stack in engagement with said stowed trays to a desired location; and g. removing said products from the frame.

16. A method of retrofitting a hand truck construction having:

a pair of laterally spaced, vertically extending side rails and crosswise side rail connecting braces forming a hand truck frame; axle supporting front to rear extending brackets fixed to the lower ends of the side rails to extend rearwardly thereof; an axle and wheel mechanism secured to the rear ends of said brackets; and a nose piece having a forwardly extending load support platform mounted on the lower end of said frame; comprising the step of:

a. connecting a plurality of trays having product stabilizing wall abutments of a crosswise length less than the spacing between said side rails by connecting forwardly extending tray brackets hingedly to said frame side rails for movement from a substantially horizontal load support operative position to a vertically disposed inoperative stowed position in substantial parallelism with said side rails in which said tray abutments extend between said side rails.

* * * * *